(12) United States Patent
Farrar et al.

(10) Patent No.: US 6,626,582 B2
(45) Date of Patent: Sep. 30, 2003

(54) SNAP-ON CONNECTOR SYSTEM FOR COUPLING LIGHT FROM AN ILLUMINATOR TO A FIBER OPTIC

(75) Inventors: Harry Farrar, Woodland Hills, CA (US); Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/781,551

(22) Filed: Feb. 13, 2001

(65) Prior Publication Data

US 2002/0012502 A1 Jan. 31, 2002

Related U.S. Application Data

(60) Provisional application No. 60/183,146, filed on Feb. 17, 2000.

(51) Int. Cl.$^7$ .................................................. G02B 6/36
(52) U.S. Cl. ............................ 385/53; 385/88; 385/92; 385/70; 385/58
(58) Field of Search ................................. 385/88–94, 78, 385/71, 72, 58–60, 140, 70

(56) References Cited

U.S. PATENT DOCUMENTS

| | | | |
|---|---|---|---|
| 3,948,582 A | | 4/1976 | Martin |
| 4,273,413 A | | 6/1981 | Bendiksen et al. |
| 4,735,482 A | | 4/1988 | Yoshida et al. |
| 4,737,008 A | | 4/1988 | Ohyama et al. |
| 4,772,081 A | | 9/1988 | Borgos et al. |
| 4,824,202 A | | 4/1989 | Auras |
| 4,883,333 A | | 11/1989 | Yanez |
| 5,065,448 A | * | 11/1991 | Ortiz, Jr. ..................... 385/53 |
| 5,113,462 A | * | 5/1992 | Clancy et al. ................ 385/53 |
| 5,142,600 A | | 8/1992 | Ortiz, Jr. |
| 5,151,961 A | * | 9/1992 | Hvezda et al. ................ 385/60 |
| 5,640,478 A | * | 6/1997 | Roller ......................... 385/136 |
| 5,761,356 A | | 6/1998 | Li |
| 5,764,837 A | * | 6/1998 | Roller ......................... 385/136 |
| 6,065,882 A | * | 5/2000 | Roller et al. ................ 385/136 |
| 6,094,517 A | * | 7/2000 | Yuuki ........................... 385/43 |
| 6,409,391 B1 | * | 6/2002 | Chang .......................... 385/115 |

FOREIGN PATENT DOCUMENTS

| | | |
|---|---|---|
| EP | 0519219 | 12/1992 |
| WO | WO 9704341 A1 | 2/1997 |

* cited by examiner

*Primary Examiner*—Hemang Sanghavi
*Assistant Examiner*—Scott A Knauss
(74) *Attorney, Agent, or Firm*—Rothwell, Figg, Ernst & Manbeck PC

(57) ABSTRACT

The present invention provides a connector assembly comprising (1) a first adapter that releasably connects to light source and transmits optical energy received from the light source along a first optical waveguide; (2) a second adapter that releasably connects to first adapter to receive and transmit optical energy along a second optical waveguide; and (3) an output optical waveguide that receives the transmitted optical energy from the second waveguide and has a proximal connector adapted to fixedly engage the second adapter. In one embodiment, the proximal connector has a slot that allows for the insertion of a clip, and the second adapter has a detente that mechanically engages the clip when it is inserted into the slot in the proximal connector. In this way, the second adapter is fixedly coupled to the proximal connector but may also rotate in relation to the output connector. In one implementation, the groove in the adapter is angled so that an inserted clip presses against the angled surface, resulting in a force to urge and hold the second adapter into proper position for optical connection between the first optical waveguide and the output optical waveguide.

2 Claims, 15 Drawing Sheets

SNAP-ON CONNECTOR SYSTEM FOR COUPLING LIGHT FROM AN ILLUMINATOR TO A FIBER OPTIC

This application claims the benefit of U.S. Provisional Application No. 60/183,146 filed on Feb. 17, 2000, the contents of which are hereby incorporated by reference in full.

FIELD OF THE INVENTION

This invention relates to an improved adaptor assembly that releasably connects a fiber optic waveguide to a fiber optic illuminator and protects the fiber optic waveguide from contamination during use and handling.

BACKGROUND OF THE INVENTION

Many types of light source systems have been developed to couple light from a high intensity light source, such as an arc lamp, into a light pathway comprising a single optical fiber or a fiber optic bundle constructed from a light conducting material such as glass or plastic. Light energy carried through the optical fibers is used in various industrial, commercial, and medical applications. For example, light energy carried through optical fibers is used in the medical field to provide illumination to various medical components, including headlights, endoscopes, and assorted surgical instruments.

FIG. 1 illustrates a typical fiber optic illumination system used in medical and industrial applications. The fiber optic illumination system includes an optical light source system 2 having a light source 3 and an optical system 4 for collecting and focusing the light emitted by the light source. An illumination device 8, such as an endoscope, is connected to the light source system 2 via an optic fiber light guide 6 coupled to the light source system 2 by a proximal connector 5. The optic fiber light guide 6 may be a fiber optic bundle or a single optic fiber. Typically, the proximal connector 5 is removable from the light source system 2 in order to increase the convenience of using the illumination device 8. For instance, the same light source system 2 may be used with multiple, different illumination devices 8.

The light source 3 is typically a light source having an envelope. Preferably, the light source 3 comprises an arc lamp such as a xenon lamp, a metal-halide lamp, a HID lamp, or a mercury lamp. The arc lamps are desirable because they produce light energy of high intensity. For certain applications, filament lamps, e.g., halogen lamps, can be used, provided the system is modified to accommodate the non-opaque filaments of the lamp. Typically, the positioning of the output waveguide is slightly altered so that the proximal, input end of the output waveguide is not in the shadow of the filament.

The light source system may further include various optical collection and condensation systems (not illustrated) that employ various lenses, mirrors, and filters. For example, it is well known in the art to use ellipsoidal reflectors to condense the light energy and to use parabolic reflectors to collimate the light energy. The various components of the optical collection and condensation system may be combined to produce desired results. Likewise the various components of the optical collection and condensation system may be positioned in numerous on-axis and off-axis arrangements as needed to produce desired illumination.

Traditional types of proximal connectors systems include a fixed adaptor, a turret adaptor, and a universal adaptor. However, these traditional proximal connectors are bulky and heavy. As a result, when a traditional proximal connector is removed from the light source system 2, the weight of the proximal connector stresses the optic fiber light guide 6 unless carefully handled.

Another disadvantage to the traditional proximal connector is that it positions the proximal end of the optic fiber light guide 6 approximately at a point inside the light source where the light is most concentrated. Although this positioning of the optic fiber light guide 6 maximizes the collection of light energy, energy from the light source 3 is absorbed and accumulated by the connector and the light guide 6 as heat energy. As a result, the traditional proximal connector often becomes very hot, which is a hazard to people working with the optical illumination system. The heating of the proximal connector also degrades the performance of the system by distorting the transmitted light energy and potentially damaging the optic fiber light guide 6.

A further disadvantage to the traditional proximal connectors is their relative high costs. In particular, the cost for the traditional proximal connector becomes prohibitive in applications where the optic fiber light guide 6 is intended to be disposed after a single use, such as endoscopic medical procedures in which the optic fiber light guide 6 is inserted into a human body.

In response to these disadvantages of traditional proximal connectors, alternative proximal connectors have been developed. For example, U.S. Pat. No. 5,640,478 discloses an optical system, illustrated in FIGS. 2–3, having a cone-shaped proximal connector 30 that connects to a correspondingly shaped opening 24 in a receiving structure 26 in the house 28 for the light source system 2. With this connection system, heat absorbed by the proximal connector 30 is dissipated into the receiving structure 26, thus preventing the undesired accumulation of excessive heat energy in the proximal connector 30. Furthermore, a first conical surface 32 and a second conical surface 38 properly position the proximal end 33 of connector 30 in the receiving structure 26 for receiving light energy from a light source. In this position, the first conical surface 32 and the second conical surface 38 contact an inner surface 44 of the housing 26, but the proximal end 33 is left exposed to an opening 46 in the receiving structure 26 to receive light energy. The proximal connector 30 further contains a detente 36 for engagement to a retaining formation 42, such as a spring-biased ball plunger. Although held in position to receive light energy, the proximal connect may still move radially to compensate for any twisting of the optic fiber light guide 6. As a result, the proximal connector 39 may be small and light, yet still securely position a proximal end of optic fiber light guide 6 in a desired location for receiving light energy from the light source system, as illustrated in FIG. 3.

Similarly, U.S. Pat. No. 5,764,837 ("the '837 patent") also provides a proximal connector system having a cone-shaped proximal connector 50 that connects to a correspondingly shaped opening in the light source system. As illustrated in FIG. 4, the '837 patent the connector 50 has a built-in fiber optic element 51 that extends from a proximal tip 53 of the proximal connector 50 to a proximal end 57 of the optic fiber light guide 56. The proximal end 57 of the optic fiber light guide 56 is contained in a bore 61 in a fiber cable connector 60. On a distal end of the proximal connector 50 is a fiber cable adapter 58 having an opening 59 adapted to receive the fiber cable connector 60. Light energy exits the light source system via the fiber optic element 51, which directs light energy to the output optic fiber light guide 56. As a result of this connection system, the proximal end of the optic fiber light guide 6 is moved away from area of light and heat concentration within the light system. This placement decreases heat accumulation in the optic fiber light guide 56, thereby improving the performance and durability of the fiber optic illuminator system.

Furthermore, the adapter case 58 in the '837 patent accepts a detachable connector 60 that secures the proximal end of the optic fiber light guide 56. The adapter case 58 easily detaches from a first detachable connector 60. Therefore, this system facilitates the use of a single-use, disposable optic fiber light guide 56 by allowing the same, relatively expensive proximal connector 50 with different optic fiber light guides 56.

Overall, the proximal connector of the '837 patent has a simple, light design that provides a secure connection to the light source system while allowing connection to different optic fiber light guides and protecting the proximal connector from heat accumulation. However, the proximal connector assembly 50 of the '837 patent has the disadvantage that it must closely mate with detachable connector 60 in order to achieve a reliable connection and a proper optical passageway. Thus, the proximal connector assembly 50 has little ability to accept differently configured optic fiber light guides. This limitation is significant in that various manufacturers produce optic fiber light guides with detachable connectors of differing physical configurations.

In response to this deficiency, U.S. Ser. No. 09/532,300 provides a special proximal connector assembly that is able to accept output from several different detachable connectors for optical waveguides. In particular, the proximal connector assembly provides several connection points and connection structures to allow the use of the different detachable connectors. The subject matter in U.S. Ser. No. 09/532,300 is herein incorporated by reference in full.

However, all of the known proximal connectors expose the proximal, input end of the optic fiber light guide during regular use, thereby allowing the proximal end of the optic fiber light guide to collect and accumulate dirt and debris. The dirt and debris on the optic fiber light guide 6 impede the performance of the optical system by disrupting the passage of the light energy to the fiber light guide 6. Furthermore, as the dirt and debris absorb optical energy, they can become very hot and potentially damage or destroy the optic fiber light guide.

As a result, there exists a present need for an improved optical connection system that prevents potentially damaging contamination to the optic fiber light guide while preserving the advantages of lowcost usage, proper alignment, and heat sinking, ease of handling, and adaptability for use with numerous types optical light guides.

SUMMARY OF THE INVENTION

The above-described need is addressed in accordance with the general principles of the present invention. The present invention provides a connector assembly comprising (1) a first adapter that releasably connects to the light source and transmits optical energy received from the light source along a first optical waveguide; (2) a second adapter that releasably connects to the first adapter to receive and transmit optical energy along a second optical waveguide; and (3) an output optical waveguide that receives the transmitted optical energy from the second waveguide and has a proximal connector adapted to fixedly engage the second adapter.

The first adapter has an input end positioned proximately to the focus of the light source, the position where a maximum amount of light is coupled into the first optical waveguide. The first optical waveguide can be made out of a single fiber, a cladded rod, or a fused fiber bundle. In addition, the first optical waveguide can be tapered to allow matching of the input numerical aperture to the output numerical aperture or areas. The first adapter may have a first conical surface for contact to the housing of the light source system for alignment and heat sinking. The first adapter in one embodiment has a first detente to engage releasably a retaining structure, such as a spring-biased ball plunger, when the first adapter is positioned in the light source system.

The second adapter is designed to releasably engage the first adapter. In one implementation, the second adapter with a second input end is inserted into the opening of the first adapter such that the light exiting the first output end of the first optical waveguide is coupled efficiently into the second optical waveguide. The second optical waveguide can be made out of a single fiber, a cladded rod, or a fused fiber bundle. In addition, the second optical waveguide can be tapered for matching of numerical apertures or areas. The second adapter may also have a conical surface that mates with a cavity in the first adapter for alignment and heat sinking. The second adapter in one embodiment has a second detente to engage a retaining structure, such as a spring-biased ball plunger, when the second adapter is inserted into the first adapter.

The output end of the second adapter fixedly connects to the proximal connector on the output waveguide. For example, a screw or bolt may be used to attach the second adapter and the proximal connector. In this way, the application of an axial force causes the first adapter to release from engagement with the light source system or the second adapter to release from engagement with the first adapter while the second adapter and the proximal connector continue to be attached. As a result, the proximal end of the output waveguide is rarely exposed to contamination during normal use and handling.

In another embodiment, the output end of the second adapter consists of an output conical surface for alignment and heat sinking. The proximal connector on the output optical waveguide has a matching conical surface for close contact with the output conical surface of the second adapter. The light from the second optical waveguide is coupled to the output optical waveguide efficiently without a heat buildup. The output optical waveguide can be a single fiber or a fiber bundle. The materials can be made out of glass, quartz, or plastic. For high power applications, the output proximal connector and the output end of the second adapter can be made out of metal for good heat dissipation. For lower power applications where heat is not a concern, plastic output proximal connectors can be used for lower cost.

In one embodiment, the proximal connector has a slot that allows for the insertion of a clip, and the second adapter has a third detente that mechanically engages the clip when it is inserted into the slot in the proximal connector. In this way, the second adapter may rotate in relation to the output connector. In another implementation, the groove in the adapter is angled so that an inserted clip presses against the angled surface, resulting in a force to urge and hold the second adapter into proper position for optical connection between the first optical waveguide and the output optical waveguide. In particular, the second optical waveguide is placed in close proximity to the output waveguide to allow optical connection, but a separation between the second optical waveguide and the output waveguide is preserved in order to prevent heat transfer between the waveguides.

BRIEF DESCRIPTION OF THE DRAWINGS

The features and advantages of the present invention are more fully described in the attached drawings in which corresponding elements are designated by like reference numbers and in which.

DETAILED DESCRIPTIONS OF THE INVENTION

Figure 5:
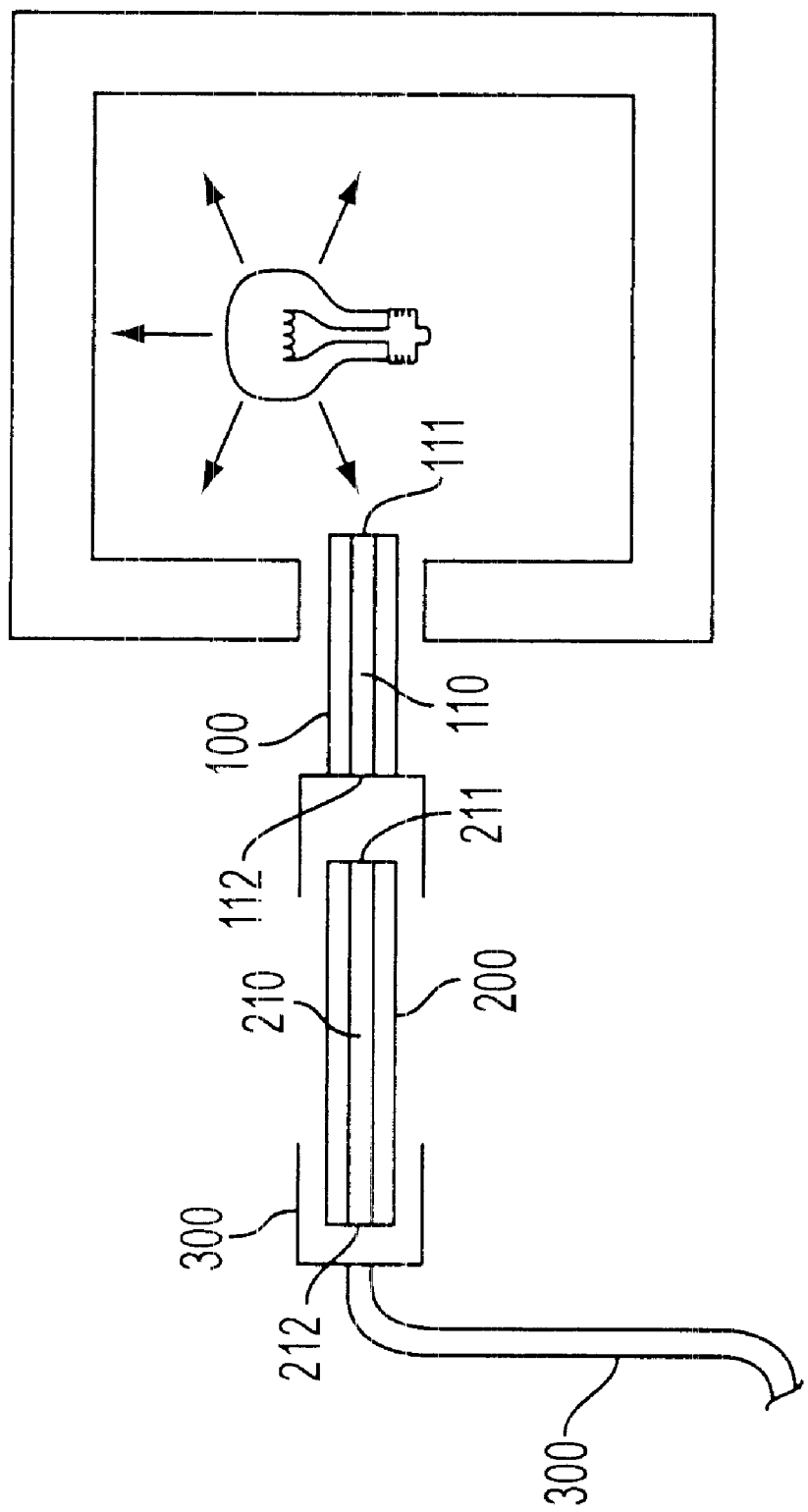
FIG. 5 is a schematic diagram of a connection system in accordance with an embodiment of the present invention.

In accordance with the present invention, an improved system for connecting an output waveguide 300 to a radiation source is schematically illustrated in FIG. 5. The illustrated system provides for an optical connection between the output waveguide 300 to the radiation source but prevents the distal end of the output waveguide from being contaminated during connection. The desired result is achieved through an adapter assembly that consists of a first adapter 100, a second adapter 200, and an output waveguide 300 with a proximal connector 310.

The first adapter includes a first optical waveguide 110 to receive and transmit optical energy from an electromagnetic radiation source. The first adapter 100 is positioned so that the first optical waveguide 110 receives light energy from the radiation source. Typically, the first adapter 100 is positioned in an opening in the housing in the light source system, as generally described the above-referenced U.S. Pat. No. 5,640,478. In particular, a first input end 111 of the first optical waveguide 110 is generally positioned in proximity to a focus of the radiation source, thereby maximizing the amount of optical energy received light received by the first optical waveguide 110. As described above, the focus for the light source may be formed through a combination of lenses and reflectors that concentrate the optical output.

A proximal end of the second adapter 200 is optically connected to the first adapter 100 so that the optical energy emitted at a first output end 112 of the first optical waveguide 110 is received at a second input end 211 of a second optical waveguide 210 in the second adapter 200. The optical coupling is typically achieved by closely positioning the first and the second optical waveguides, respectively 110 and 210. The second optical waveguide 210 transmits the received optical energy for emission at a second output end 212.

The output waveguide 300 is optically connected to a distal end of the second adapter 200 to receive the optical energy emitted at the second output end 212. More specifically, the proximal connector 310 engages the second adapter 200 so that the output waveguide 300 is optically connected to the second output end 212 of the second waveguide 210.

The individual components of the optical system connection system of the present are now described in greater detail.

First Adapter

Figure 1:
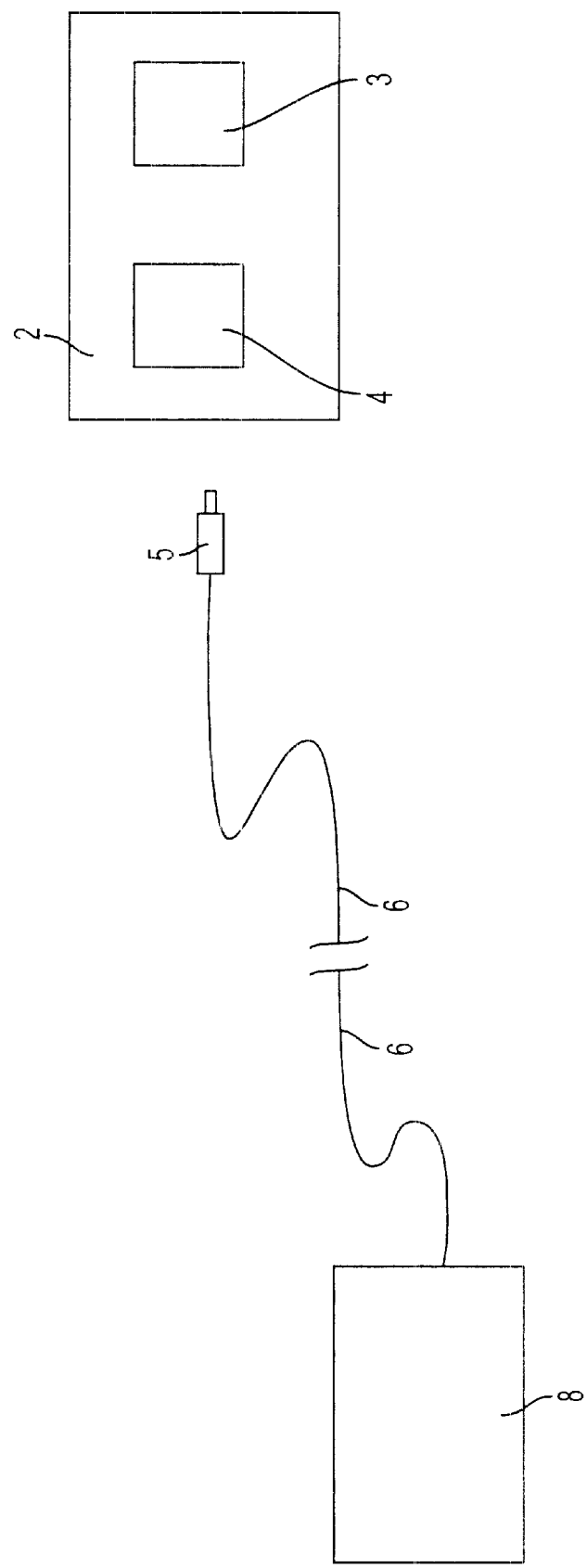
FIG. 1 (PRIOR ART) is a schematic diagram of an exemplary fiber optic illumination system.
Figure 2:
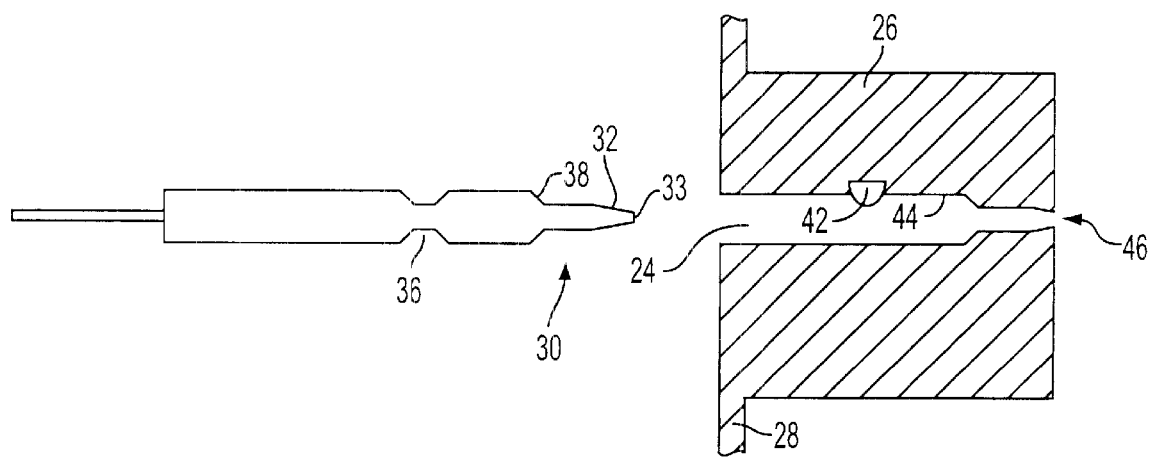
FIG. 2 (PRIOR ART) is a side view, partially in cross-section, of a known proximal connector and a portion of the housing of the light source system.
Figure 3:
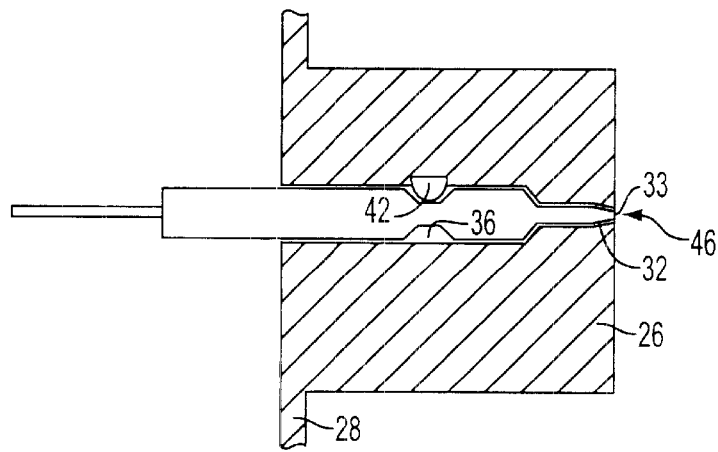
FIG. 3 (PRIOR ART) is a side view, partially in cross-section, of the elements of FIG. 2 shown with the proximal connector fully inserted within an aperture.
Figure 4:
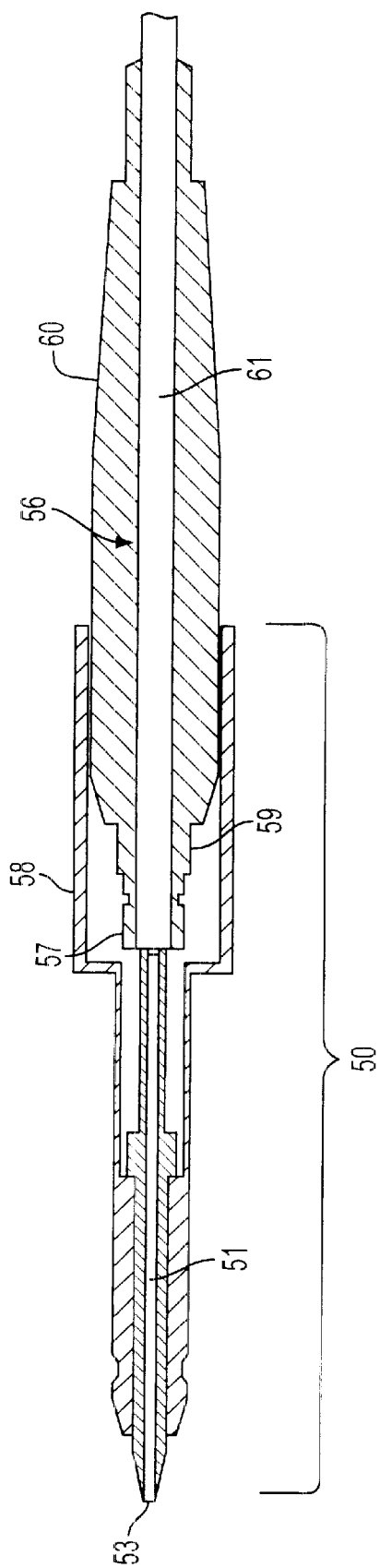
FIG. 4 (PRIOR ART) is a side view, partially in cross-section, of another known proximal connector and a portion of the housing of the light source system of FIG. 1.

A preferred embodiment of the first adaptor 100 of an adaptor assembly according to the present invention is generally described in the aforementioned U.S. Ser. No. 09/532,300 and illustrated in FIGS. 6–9. The first adaptor 100 includes a coupling structure 120 and a housing 140. The coupling structure 120 is constructed and arranged to be releasably coupled to the structure of the optical light source system housing, as generally described above in FIGS. 2–3. In the illustrated embodiment, the coupling structure 120 includes a tapered ferrule 122 secured to the housing 140 by means of a ferrule retainer 126. In the preferred embodiment, the coupling structure, as embodied by the tapered ferrule 122 and the ferrule retainer 126, is constructed and arranged to be inserted into and releasably secured in a like-shaped receiving opening formed in the optical light source system, as is described in U.S. Pat. No. 5,640,478, the disclosure of which is hereby incorporated by reference in full.

The tapered ferrule 122 is hollow and has an enlarged end 124. The tapered ferrule 122 is mounted to the housing 140 by inserting the ferrule 122 through a hollowed portion of the ferrule retainer 126 until the enlarged end 124 engages an internal shoulder 130 formed inside the ferrule retainer 126. A retainer block 134 having a conical cavity 136 is inserted into the hollowed-out ferrule retainer 126 on top of the tapered ferrule 122 with a spacer 132 disposed between the block 134 and the enlarged end 124 of the ferrule 122. The assembly of the ferrule 122, the ferrule retainer 126, and the retainer block 134 is attached to the housing 140 by means of fasteners 128.

The ferrule retainer 126 includes a tapered portion 127 and a circumferential ring 138 formed in a cylindrical portion thereof. The coupling structure 122 can be inserted into an aperture (not shown) of the optical light source system 2 having a profile that is similar to that of the coupling structure 120. The ring 138 is engaged by a retaining device, such as a ball plunger spring-biasing mechanism (not shown) to releasably retain the coupling structure 120 in the housing of the optical light source system as is described in more detail in the aforementioned U.S. Pat. No. 5,640,478.

The tapered ferrule 122 is preferably formed from a material with high thermal conductivity such as metal, most preferably aluminum or stainless steel. The ferrule retainer 126 is preferably formed from a metal or a rigid plastic material.

Figure 10:
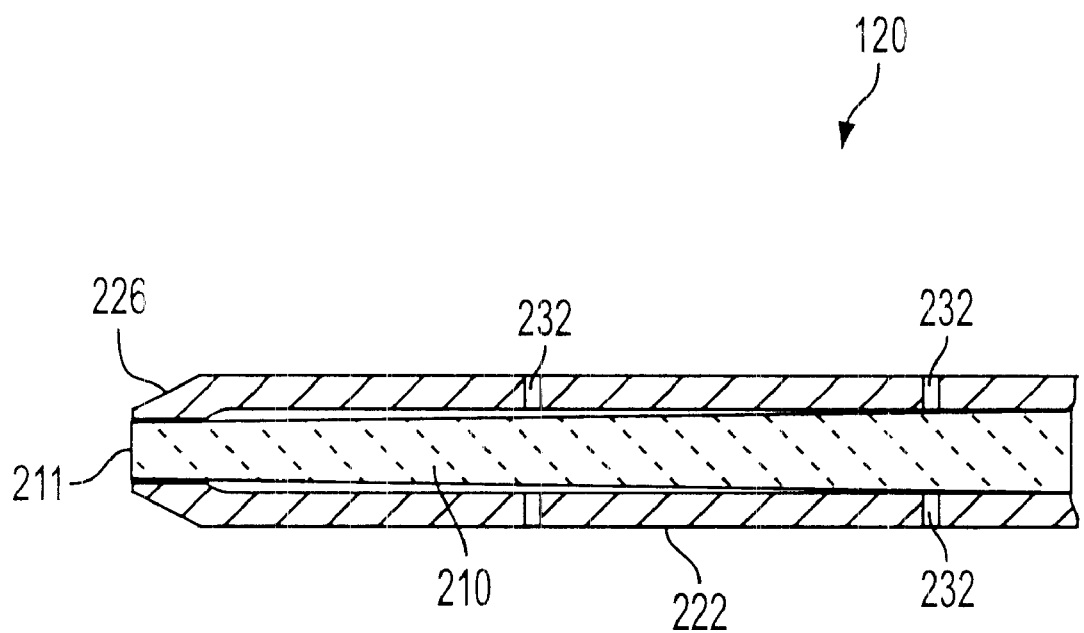
Figure 11A:
FIGS. 11a–g are cross-sectional views of various waveguides used in accordance with an embodiment the present invention.
Figure 11B:
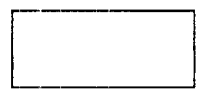
Figure 11C:
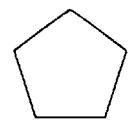
Figure 11D:
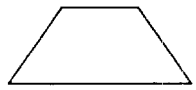
Figure 11E:
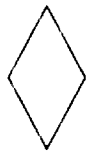
Figure 11F:
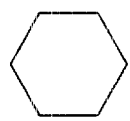
Figure 11G:

The first optical waveguide 110 extends through the coupling structure 120 and has the first input and output ends, 111 and 112. The first input end 111 is generally flush with a distal end of the tapered ferrule 122, and the first output end 112 projects beyond the retainer block 134 and into the housing 140. The first optical waveguide 110 is composed of various optically conductive materials, such as plastic, glass, quartz, etc. and may be any one of various known structures, such as single fiber, a fused fiber bundle or a cladded rod. Optionally, the first optical waveguide 120 can be tapered toward the proximal end 111, as illustrated in FIG. 10, to allow matching of an input numerical aperture to an output numerical aperture. Although the cross section of the first waveguide 120 is typically round, it may also have numerous polygonal configurations as known in the art.

FIGS. 11a–g illustrate cross-sections of various shapes, such as square, rectangle, pentagon, trapezoid, rhombus, hexagon, and oval. For example, it is common in image projection systems to use a rectangular waveguide to produce an output image of desired shape and proportion.

A channel 144 for receiving the second adapter 200 is formed in the housing 140 and extends from an opening 148 formed in a distal end of the housing 140 and terminates proximately the first output end 112 of the first optical waveguide 110, which projects partially into the housing 140. The channel 144 typically includes a conically-shaped end surface 146 and has a stepped configuration at the right-hand side thereof which defines an annular shoulder 154 and an annular end face 156. The channel 144 is constructed and arranged to receive therein the second adapter 200 inserted through the opening 148 into the channel 144 and to position the second adapter 200 with respect to the output end 112 of the first optical wave guide 110.

When assembled, focused light provided by the optical light source system will be coupled into the first input end 111 of the first optical waveguide 110. The light will thereafter be transmitted toward the first output end 112 of the first optical waveguide 110 and thereafter into the second optical waveguide 210 of the second adapter 200 inserted into the channel 144.

The first optic waveguide 110 is preferably a rigid fused fiber bundle of high temperature resistant material and, thus, is better able to withstand the temperatures proximate to focus of the light source system than the flexible fiber or fiber bundle typically employed in commercially available connectors output waveguides 300. Accordingly, the use of the first adapter 100 avoids positioning the high temperature sensitive output waveguides 300 in the intense heat of the focal point of high intensity light developed by the optical light source system, thereby preventing damage to the flexible fibers by the excessive heat.

Furthermore, the first optical waveguide 110 serves as a spatial filter to prevent unguided modes of electromagnetic energy, such as ultraviolet or infrared radiation, from entering the second input end 211 of the second adapter 200 when inserted into the channel 144. Spatial filtering is described in more detail in U.S. Pat. No. 5,761,356, the disclosure of which is hereby incorporated by reference. Therefore, the fused fiber bundle helps to eliminate light modes that cannot be guided by the output fiber light guide 300. Light modes that are filtered out by the first optical waveguide generate heat that is absorbed by the housing 140.

To assist in dissipating the heat absorbed by the housing 140, the housing 140 includes heat dissipating elements, such as fins 142, formed thereon. The housing 140 is preferably formed from a material with high thermal conductivity, such as aluminum. Furthermore, openings 150 and 152 are formed through the walls of the housing and extend into the channel 144, thereby permitting air circulation around the second adapter 200 when inserted into the channel 144.

The first adaptor 100 also includes a connector locking mechanism attached to the housing 140 and constructed and arranged to operatively engage the second adapter 200 when inserted into the channel 144 and to releasably hold the second adapter 200 inside the channel 144. In the preferred embodiment, the connector locking mechanism includes radially-biased ball detentes 162, the function of which will be described in more detail below. However, it should be appreciated that numerous other means of connecting the first and second adapters, such as screws, nails, bolts, slip fittings, clamps, and pins, are known and anticipated by the present invention.

Second Adapter

As previously described, a proximal end of the second adapter 200 is configured for insertion and engagement in the first adapter 100, as illustrated in FIG. 5 in order to optically couple first and second optical waveguides 110 and 210.

Figure 6:
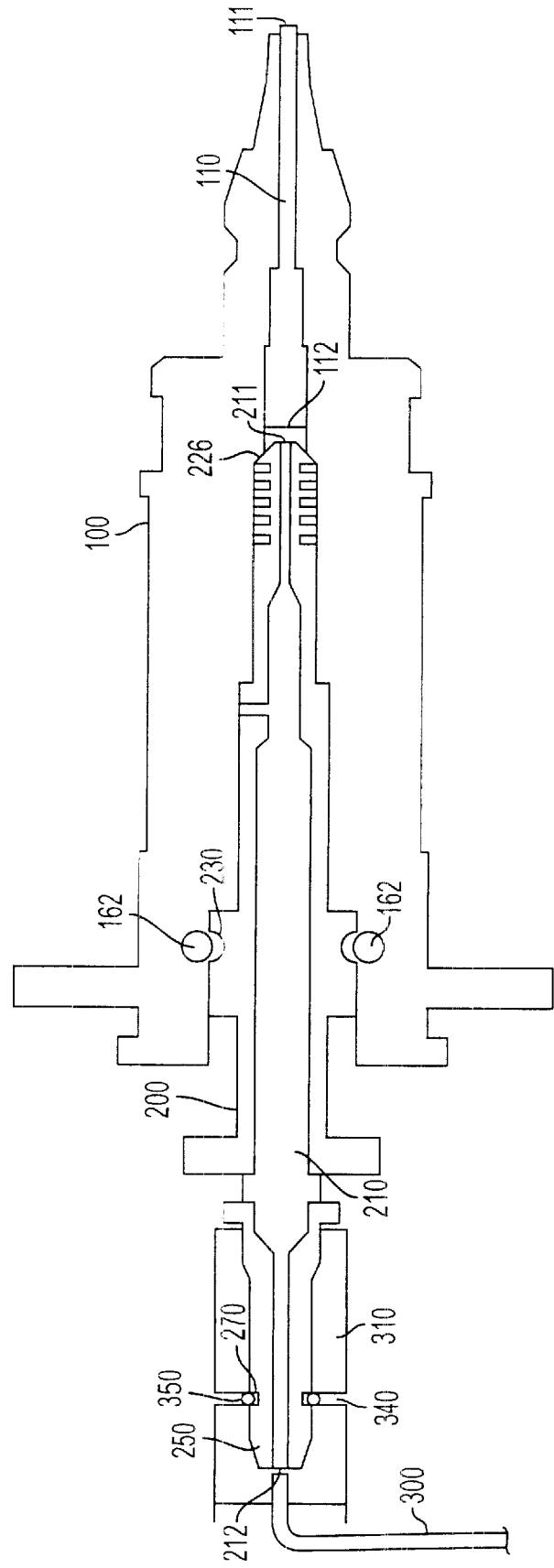
FIGS. 6, 8–9, 10, 12a–c, and 13–15 illustrate cross-sectional views of a connection system in accordance with of various embodiments the present invention.
Figure 7:
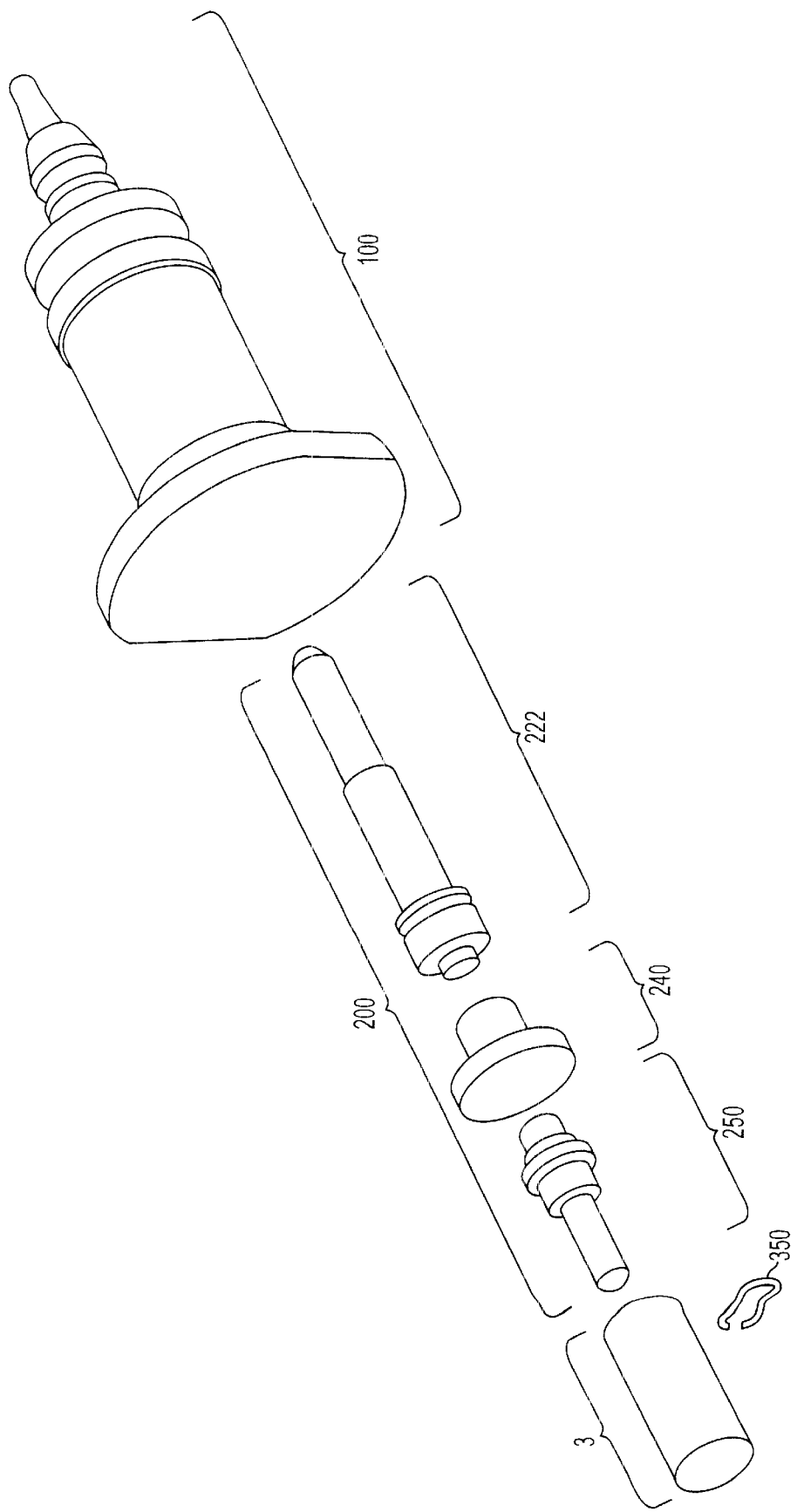
FIG. 7 is an expanded view of the connection system of FIG. 6.
Figure 8:
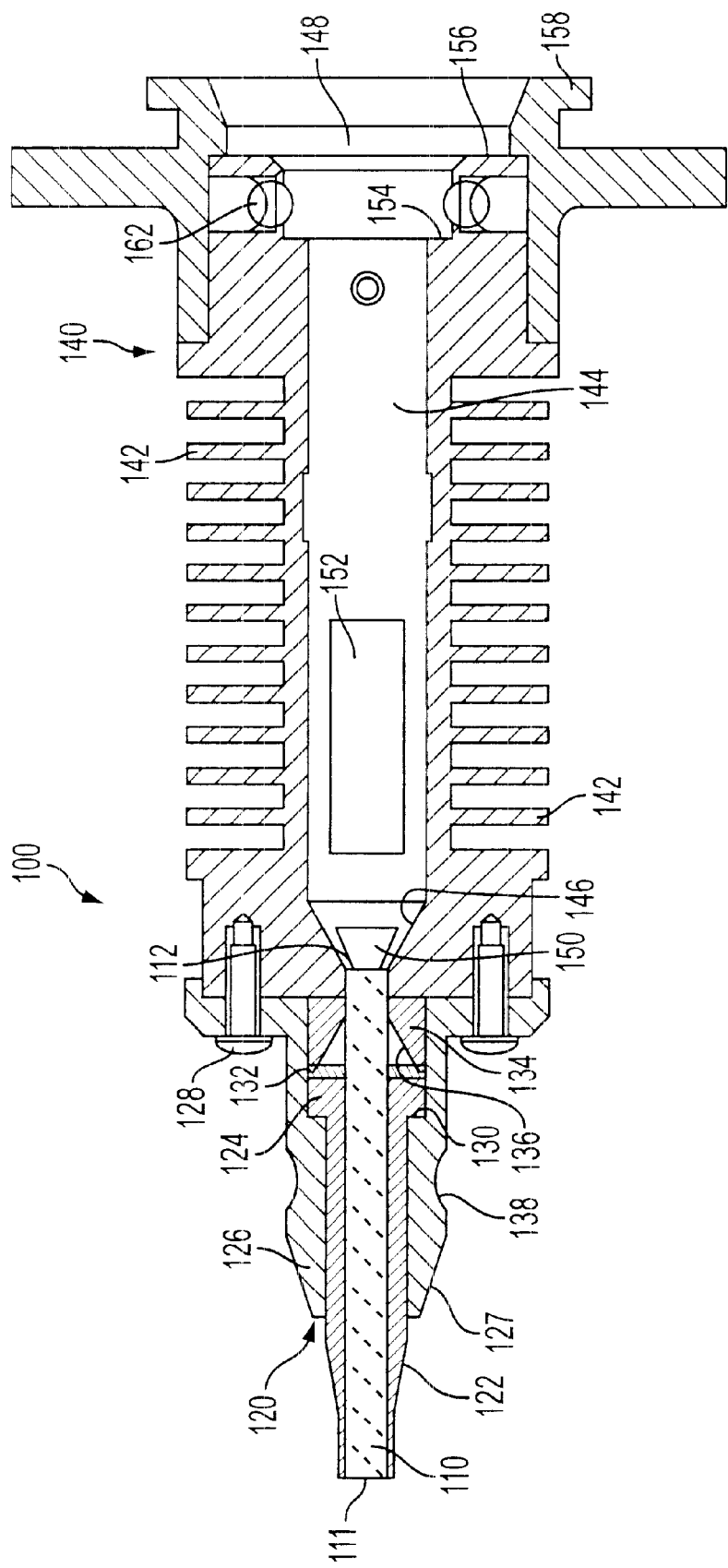
Figure 9:
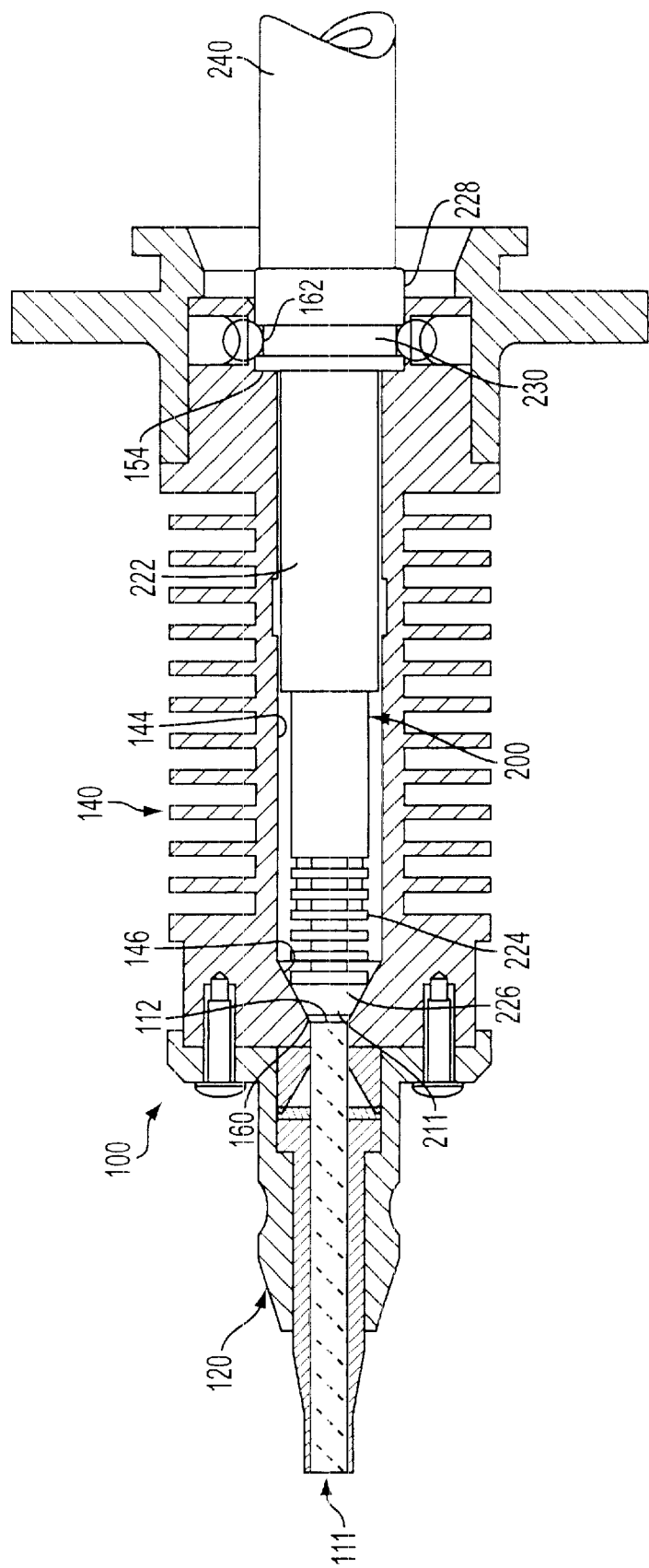

In a preferred embodiment illustrated in FIGS. 6–7, the second adapter generally comprises a proximal first segment 222, a medial second segment 240, and a distal third distal segment 250. The second optical waveguide passes through all three segments, 222, 240, and 250 with the second input end 211 being located proximate to the leading edge of the first segment and the second output end 212 being located proximate to the trailing edge of the third segment 250. The first segment 222 is adapted for releasable engagement with the first adapter, as described above. Alternatively, the first segment 222 may directly engage the housing of the light source system to allow the connection system of the present system without the use of the first adapter. In either implementation, the third segment 250 fixedly attaches to the proximal connector 310 on the output waveguide 300. The second segment 240 connects the first and third segments, 222 and 250.

As illustrated in FIGS. 6–9, the second adapter 200 includes the elongated, axially-extending proximal first segment 222 projecting from an enlarged diameter collar 228. The first segment 222 has a chamfered end 226 shaped so as to conform to the conical end surface 146 of the receiving channel 144. The conforming surfaces of the chamfered end 226 and the conical end surface 146 promote better heat dissipation from the first segment 222 through the housing 140. Heat dissipating fins 224 are optionally formed on the exterior of the first segment 222 near the chamfered end 226 in the vicinity of openings 150 and 152. The heat dissipating fins 224 are provided to promote more efficient heat dissipation from the first segment 222 of the second adapter 200. A peripheral groove 230 is formed in the collar 228. When the first adapter 100 is inserted into the channel 144, the ball detentes 162 engage the groove 230, thereby retaining the second adapter 200 inside the channel 144. In addition to retaining the second adapter 200 inside the channel 144, the ball detentes 162 are shaped so as to exert an axial force on the connector 200, thereby urging the chamfered end 226 into contact with the conical end surface 146. To remove the second adapter 200 from the channel 144, the holding force of the ball detentes 162 can be overcome by pulling on the second adapter 200, generally the second segment 240, with sufficient axial force. The first segment 222 of the second adapter 200 is preferably sized and configured so that a first gap 160 is provided between the second input end 211 of the second adapter 200 and the first output end 112 of the first optical wave guide 110. The first gap 160 prevents direct contact between the first optical waveguide 110 and the second optic waveguide 210 in the second adapter 200, thereby limiting heat exchange between the first and second optic waveguides 110 and 210 and minimizing damage caused by debris on the end surface of either waveguide 110 or 210.

An interior view of the second adapter 200 is seen in FIG. 6. As previously described, the second adapter 200 includes the second optical waveguide 210 for transmission of optical energy received at the second input end 211 from the first optical waveguide 110 of the first adapter 100. The second optical waveguide 210, similar to the first optical waveguide 110, can be made out of a single fiber, a cladded rod, or a fused fiber bundle. In addition, the second optical waveguide 210 can be tapered for matching of numerical apertures or areas, as needed for the optical system. For example, FIG. 10 shows the second optical waveguide tapering toward the proximal end 211 within the first segment 222 of the second adapter 200. The second adapter 200 may further include one or more radially-extending openings 232 that are formed in the walls of the second adapter 200. The openings 232 are provided to permit the injection of a binding substance, such epoxy, into the second adapter 200 for securing the second optical waveguide 210.

The medial second segment 240 connects the first segment 222 and the third segment 250. The medial second segment 240 of the second adapter 200 extends from the collar 228, away from first adapter 100. The second segment 240 may further include an annular flange 242 that extends radially from the surface wall the second segment 240. The annular flange 242 provides a gripping structure to allow a user to grab and hold easily the second adapter. The user may then apply an axial force to the second adapter 200 via the annular flange 242 to insert or remove the second adapter from the first adapter, as previously described.

Figure 12A:
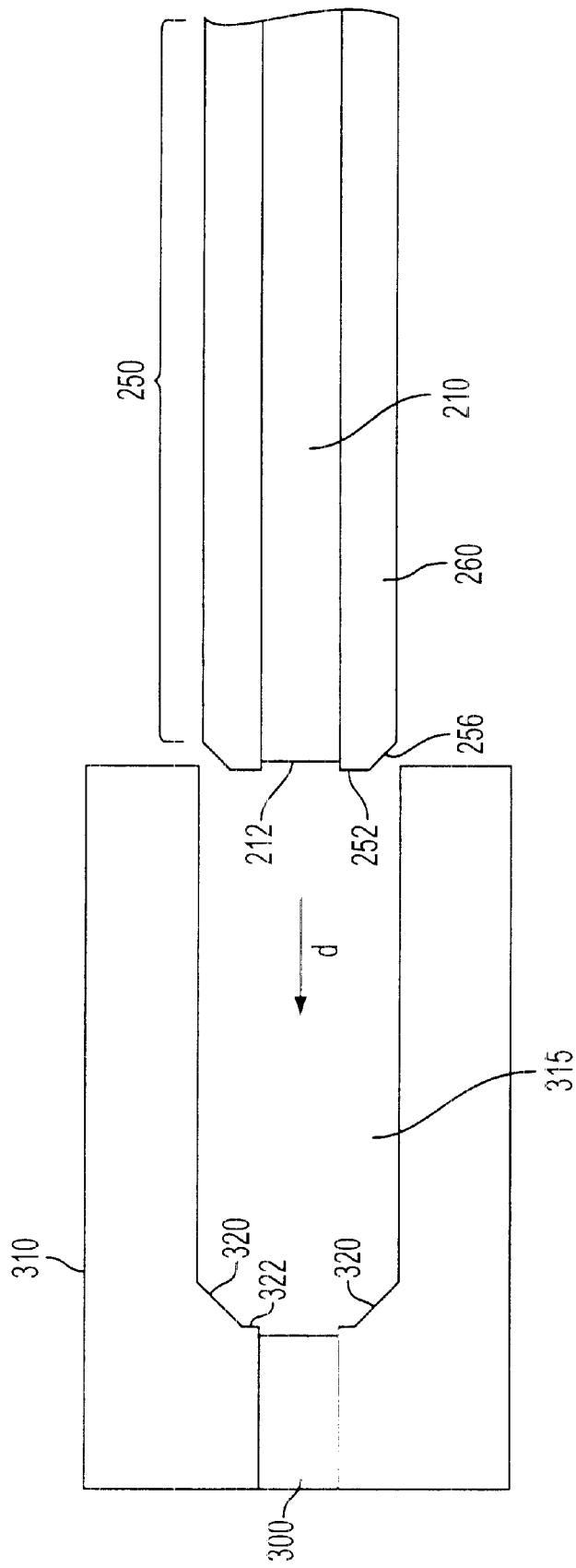
Figure 12B:
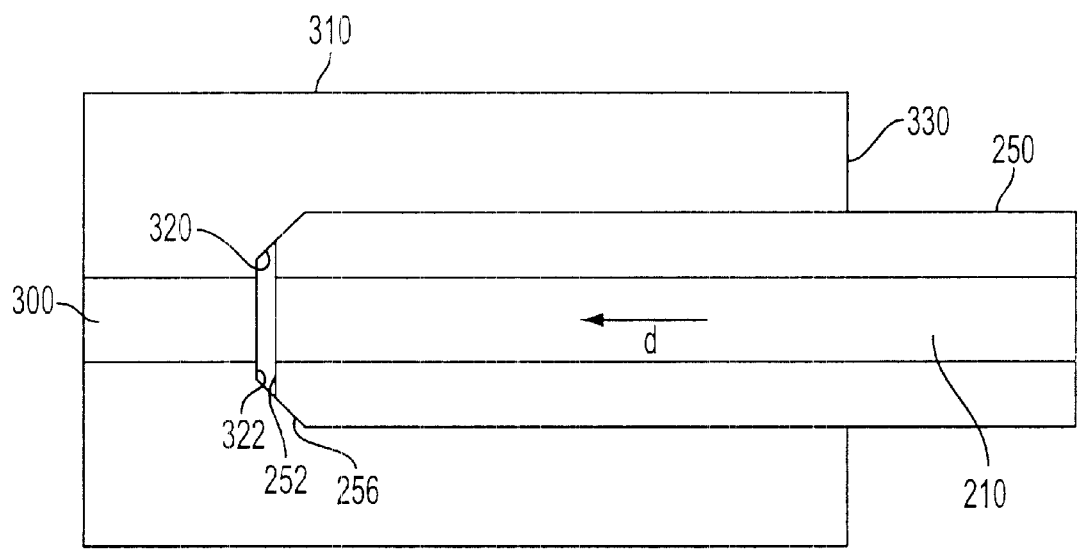
Figure 12C:
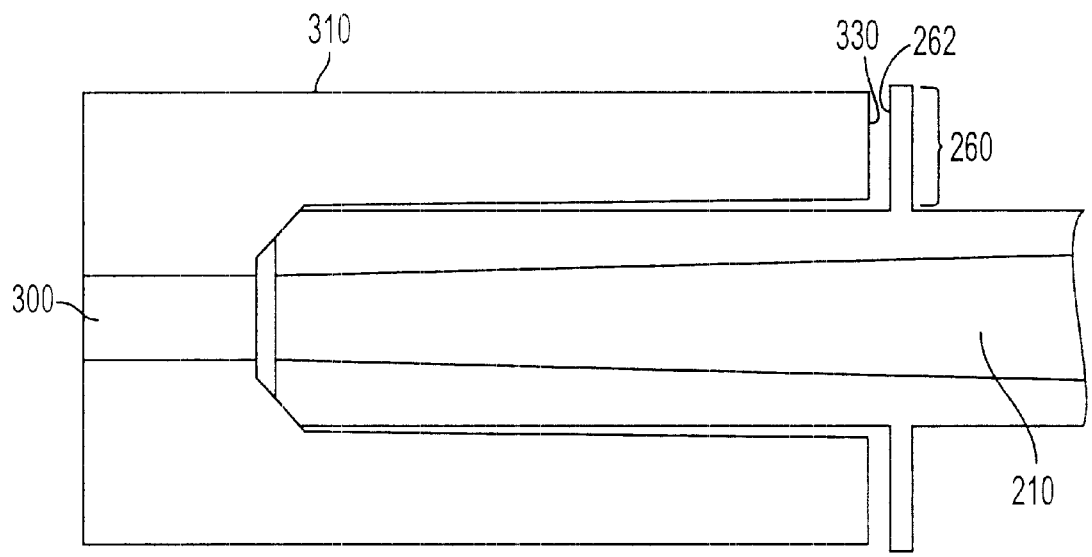

The second adapter further includes the third segment 250 that connects to the medial second segment 240. The third segment 250 attaches to the output proximal connector 310 on the output waveguide 300. In particular, the third segment 250 is configured for insertion and attachment in a cavity 315 in the output proximal connector 310, as illustrated in FIGS. 12a–b. In one embodiment, the third segment 250 has a generally elongated, axially-extending distal structure projecting from an optional annular shoulder 260 with an annular surface 262. The insertion of third segment 250 into the cavity 315 of the proximal connector into the proximal connector is limited by the annular shoulder 260 as the annular surface 262 contacts the proximal surface 330 of the proximal connector 310. The annular shoulder 260 further provides a handling structure for the third segment 250. The third segment 250 has a chamfered end 256 at a distal end 252 shaped so as to conform to the conical end surface 320 of the receiving cavity 315 in the proximal connector 310. The conforming surfaces of the chamfered end 256 and the conical end surface 320 promote better heat dissipation from the third segment 250 through the proximal connector 310.

It should be appreciated that the third segment 250 and the proximal connector 310 may be alternatively configured (not illustrated) in which the proximal connector is configured for insertion and attachment in a cavity in the second adapter 200. In this alternative configuration, the proximal connector has a generally elongated, axially-extending proximal structure. The proximal connector 310 may then have a chamfered end at a proximal end shaped to conform to a surface of the receiving cavity in the second adapter 200.

The proximal connector 310 further includes some type of structure for mechanically engaging the third segment portion 250 of the second adapter 200. This fixed engagement may be achieved through a connecting device such as a screw or bolt, such that the second adapter 200 and proximal connector 310 may be separated, but remain connected during normal operation and use. In this way, the proximal end of the output waveguide 300 is rarely exposed and, thus, less likely to be contaminated.

Figure 13:
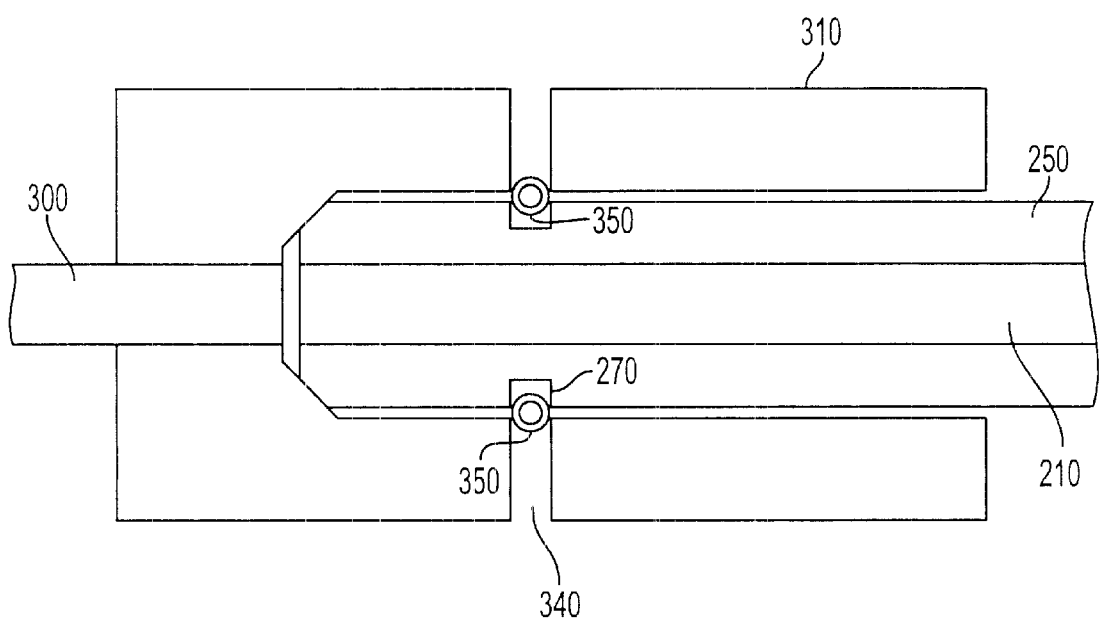

In a preferred embodiment illustrated in FIGS. 6, 7 and 13, a rotatably fixed engagement is achieved through a clip 350 that passes through a slot 340 in the proximal connector 310 to engage the third segment 250 of the second adapter 200. Typically, the third segment 250 has a retaining structure, such as circumferential groove 270 to engage the clip 350. It should be appreciated that numerous alternative retaining devices, such as pins, clamps, snap fits, flanges, collars, Morse tapers, etc. The second adapter 200 may rotate relative to the proximal connector 310, but the range of axial motion along the path of optical energy is limited as the clip 350 contacts a surface in the slot 340 to prevent removal or further insertion of the second adapter 200. Again, the second adapter 200 and the proximal connector 310 remain connected during normal use, but can be separated when needed. For example, the output waveguide 300 may be replaced, as needed, to be used with the same the same second adapter 200. Likewise, the output waveguide 300 may be attached to a different second adapter 200 to allow connection to an alternatively configured light source system of first adapter 100.

Figure 14:
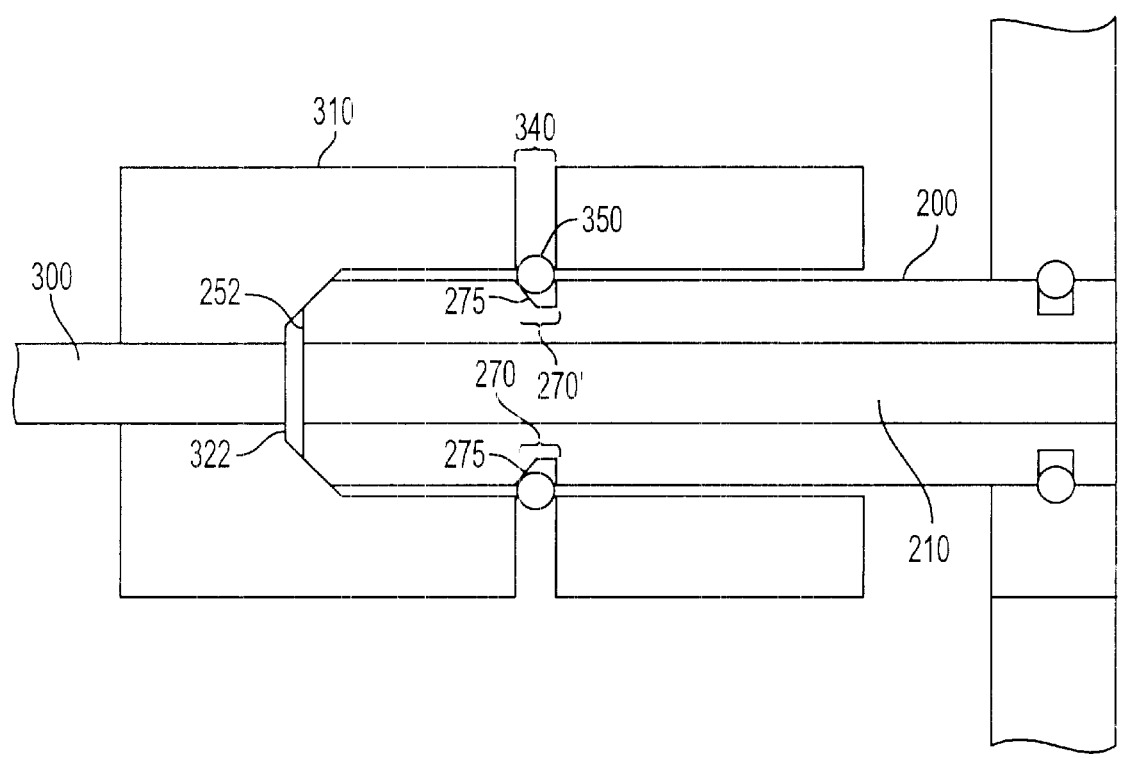

As well known in the art, the output optical waveguide 300 can be a flexible single fiber or a fiber bundle, as needed for the desired application. The output optical waveguide 300 can be made out of from various transparent materials such as glass, quartz, or plastic. As illustrated in FIGS. 13 and 14, the output proximal connector 300 with is generally a fiber that is recessed inside a hole in the proximal connector 310.

For high power applications, the output proximal connector 300 and the third segment 250 of the second adapter 200 are made out of a metal or other material with good heat conduction and dissipation properties, such as aluminum. For lower power applications where heat accumulation is not a concern, plastic output proximal connectors can be used to lower costs.

FIG. 14 illustrates an improved connection system between the second adapter 200 and the proximal connector 310. In this embodiment, the circumferential groove 270' in the third segment 250 has an angled surface 275. When the clip 350 is inserted into its operating position of engagement with the circumferential groove 270', the clip is pressed against the angled surface 275. The clip 350 then interacts with the angular surface 275 to urge the second adapter 200 toward the proximal connector 310. Preferably, the chamfered end 256 is brought into contact with the conical end surface 320 to achieve the desired heat dissipation.

Figure 15:
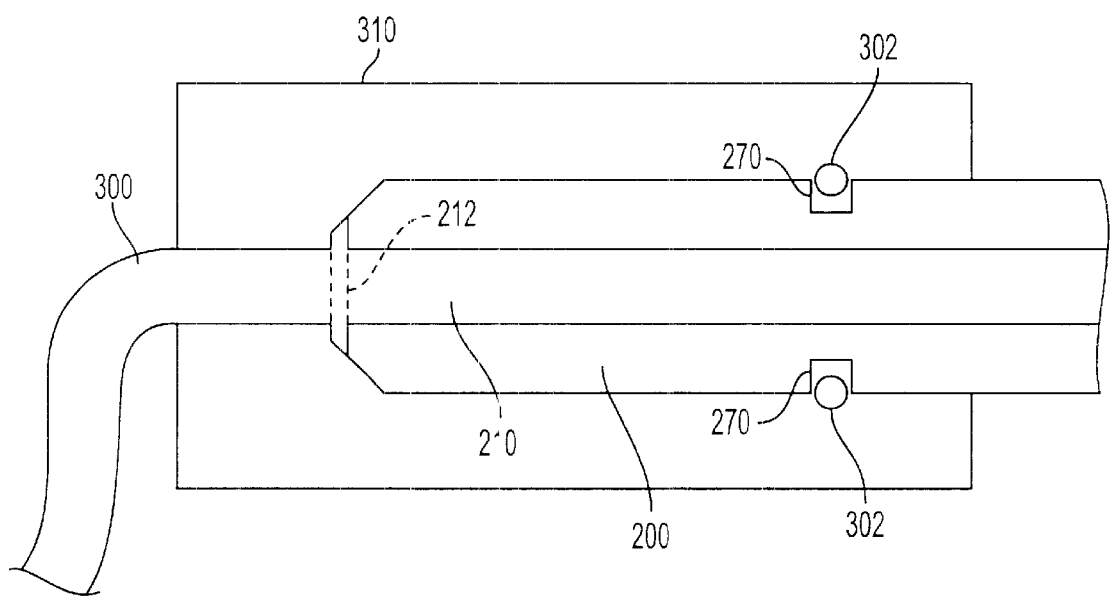

Alternatively, the second adapter 200 and the proximal connector 300 may be designed configured to attach using other known attachment configurations. FIG. 15 illustrates an exemplary implementation in which the proximal connector 300 has a third set of spring loaded ball 302 that interacts with the circumferential groove 270 in the second adapter. In order to achieve the present invention's goal of a fixed, rotatable connection, the third set of spring loaded balls 302 may have a far greater elastic pressure that the spring loaded balls in the light source system (not illustrated) that engage the first adapter 100 at ring 138 or the ball detentes 162 that engage the groove 230 in second adapter 200

Preferably, the depth of cavity 315 in the output proximal connector 310 and the inserted length of the third segment 250 of the second adapter are configured so that the second adapter's distal surface 252 and the proximal surface 322 do not contact, but the chamfered end 256 is brought into contact with the conical end surface 320, as illustrated in FIGS. 12A–B. This implementation provides thermal isolation between the two waveguide elements, 210 and 300, and also helps to minimize damage to the relatively soft output waveguide caused by foreign debris disposed between the end faces of the coupled waveguide, 210 and 300. Heat transfer may still occur between the second adapter 200 and the proximal connector 310, but heat energy is not transferred from the second waveguide 210 to the flexible, temperature-sensitive output waveguide 300. However, the separation between distal surface 252 and the proximal surface 322 should be minimized for efficient coupling to maximize the light transfer between the second waveguide 210 and the output waveguide 300.

In another embodiment of these inventions, the first adapter 100 and second adapter 200 are combined into a single adapter. In this implementation, a single waveguide conducts light from the light source system directly to the input end 322 of the output optical waveguide 300. For example, the use of the first adapter may be avoided by directly attaching the second adapter to the light source system, as shown in FIG. 14.

In another embodiment, connection system can be adapted for use with different commercial illuminators. In medical applications, for example, an illumination device such as that available from Karl Storz GmbH and Co. KG of Tuttlingen, Germany, has discrete output connectors that are each designed specifically for a particular type of fiber optic cable connector, such as a connector available from the Karl Storz Company. Illumination devices available from Luxtec Corporation of Worcester, Mass., incorporate a turret design with four ports, each of which is adapted to a particular commercially available fiber optic cable connector available from different manufacturers, namely, Karl Storz GmbH, Olympus, AccuMed International of Chicago, Ill. (ACMI), and Wolf. The turret adaptor is used by turning it to an appropriate position depending on which cable connector is being used. In another system available from Luxtec Corporation, the output connector system consists of a horizontal slide with three adapters for three different fiber optic cable connector systems. A third type of adaptor system available from Linvatec Corporation of Largo, Fla., involves a universal connector system with a chucking mechanism or a set screw that accepts various connectors. The first and second adapters, 100 and 200, can be configured as needed for use with these various illumination systems. Alternatively, one or more additional adapters may be used with the presently described connection system to allow connection to alternatively configured illumination systems. For example, the above-cited U.S. Ser. No. 09/532,300 provides a special proximal connector assembly that is able to accept output several different detachable connectors for optical waveguides. In particular, U.S. Ser. No. 09/532,300 provides a proximal connector assembly with several connection points and connection structures to allow the use of the different detachable connectors. Accordingly, the present connection system may be adapted in accordance with the teachings of the U.S. Ser. No. 09/532,300 to allow connection with multiple types of illumination systems. Alternatively, the proximal end of the second adapter may be adapted as necessary for use with an illumination system. With either of these modifications, the distal, output end of the second adapter 200 continues to use the design of the current invention as shown in the previous figures to achieve the desired result of a rotatable, fixed connection.

It should be appreciated that further components may be added or interposed between the elements 100, 200, and 310. For example, various focusing, homogenizing, and filtering elements may be used to alter the light stream as desired. Likewise, various other known couplers, splitters, adapters, or mirrors may be used as well to redirect the light energy.

While the invention has been described in connection with what are presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed:

1. A connector system for coupling electromagnetic radiation energy from a radiation source to an output waveguide, said connector system comprising:

a first waveguide having a first input end and a first output end;

a first adapter constructed and arranged to be optically coupled to the radiation source, said first waveguide being disposed within said first adapter, said first input end being exposed at a proximal end of said first adapter to receive some of the radiation energy, said first output end being exposed at a distal end of said first adapter to emit some of the radiation energy received at the first input end;

a proximal connector attached to said output waveguide, wherein said proximal connector is fixedly coupled to said first adapter to allow said output waveguide to receive some of the radiation energy emitted by the first waveguide;

wherein said first waveguide has polygonal cross-section.

2. A connector system for coupling electromagnetic radiation energy from a radiation source to an output waveguide, said connector system comprising:

a first waveguide having a first input end and a first output end;

a first adapter constructed and arranged to be optically coupled to the radiation source, said first waveguide being disposed within said first adapter, said first input end being exposed at a proximal end of said first adapter to receive some of the radiation energy, said first output end being exposed at a distal end of said first adapter to emit some of the radiation energy received at the first input end;

a proximal connector attached to said output waveguide, wherein said proximal connector is fixedly coupled to said first adapter to allow said output waveguide to receive some of the radiation energy emitted by the first waveguide;

wherein said first waveguide comprises a tapered fused fiber bundle.

* * * * *